Figure 1:
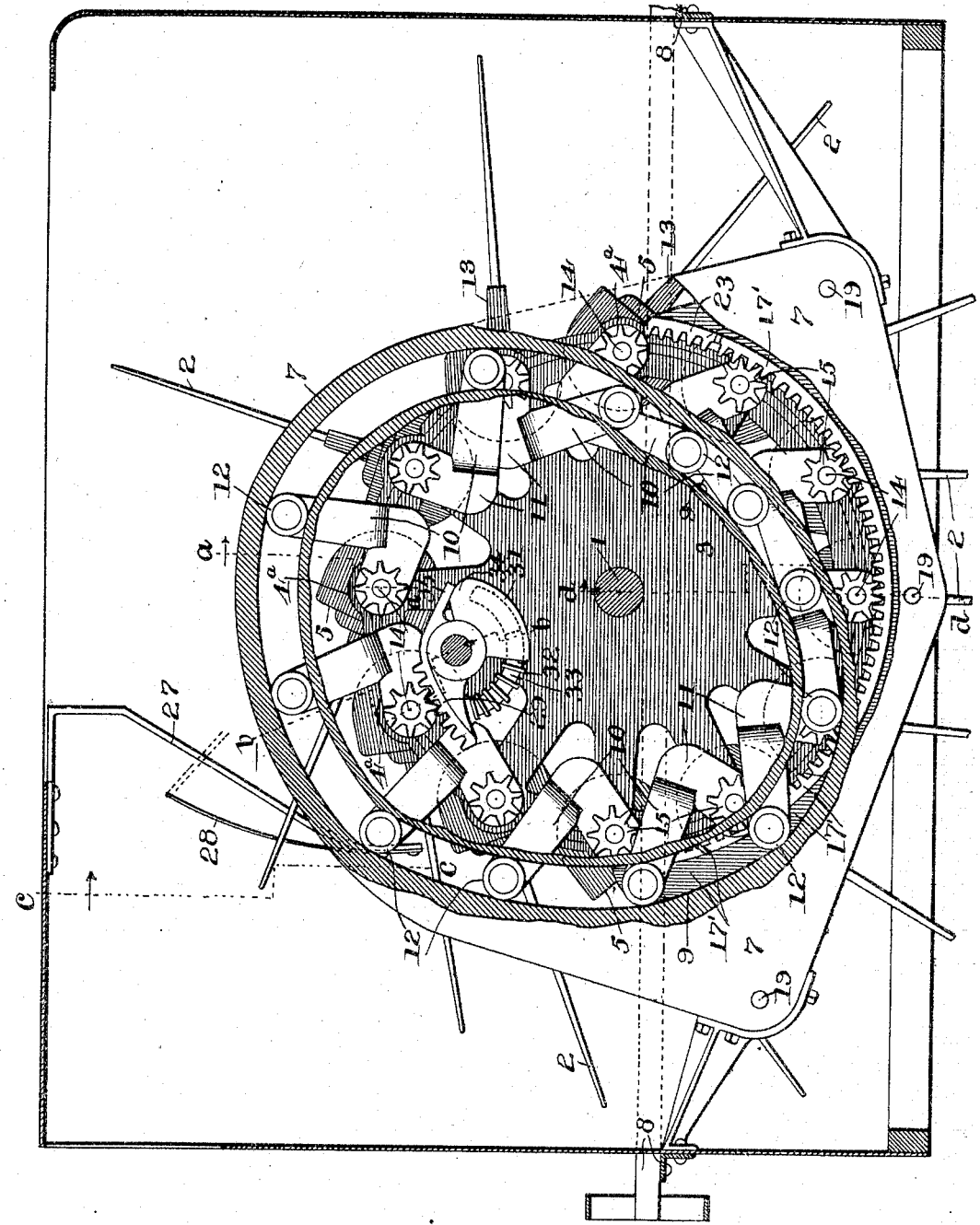

No. 788,812. PATENTED MAY 2, 1905.
J. F. APPLEBY.
COTTON PICKING MACHINE.
APPLICATION FILED MAY 28, 1904.

3 SHEETS—SHEET 1.

Witnesses:—
C. H. Crawford
Leon Stroh

Inventor:
John F. Appleby
by G. L. Cross
His Attorney

No. 788,812. PATENTED MAY 2, 1905.
J. F. APPLEBY.
COTTON PICKING MACHINE.
APPLICATION FILED MAY 28, 1904.
3 SHEETS—SHEET 2.
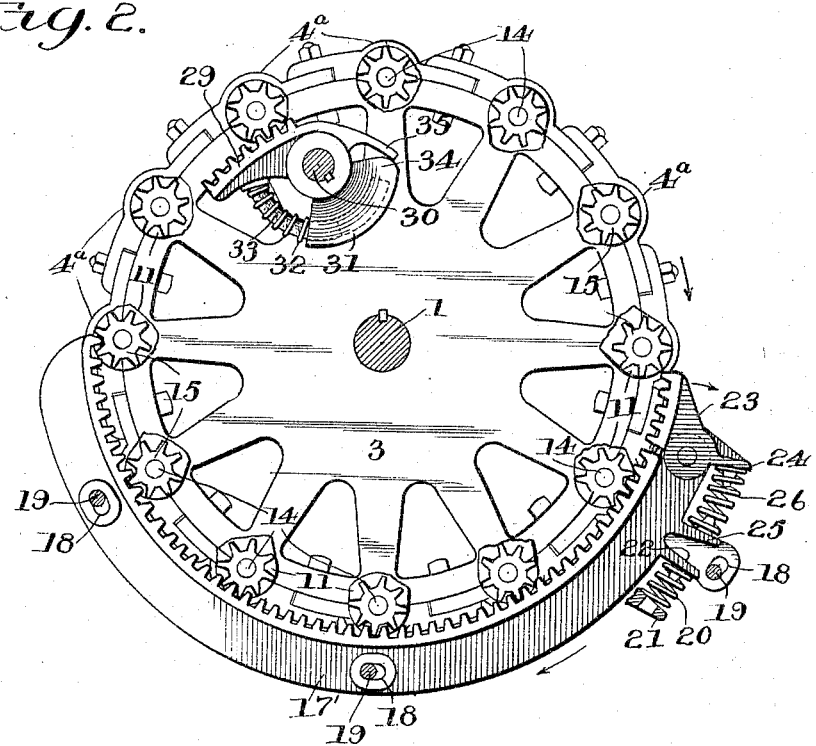
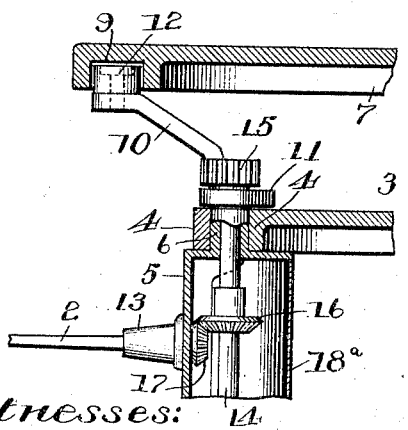
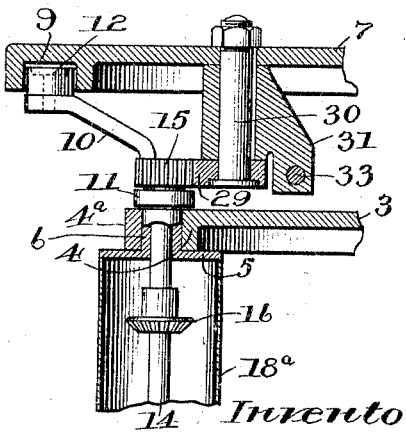
Witnesses:
Carl H. Crawford
Leon Stroh
Inventor:-
John F. Appleby
by G. L. Cragg
his Attorney No. 788,812. PATENTED MAY 2, 1905.
J. F. APPLEBY.
COTTON PICKING MACHINE.
APPLICATION FILED MAY 28, 1904.
3 SHEETS—SHEET 3.
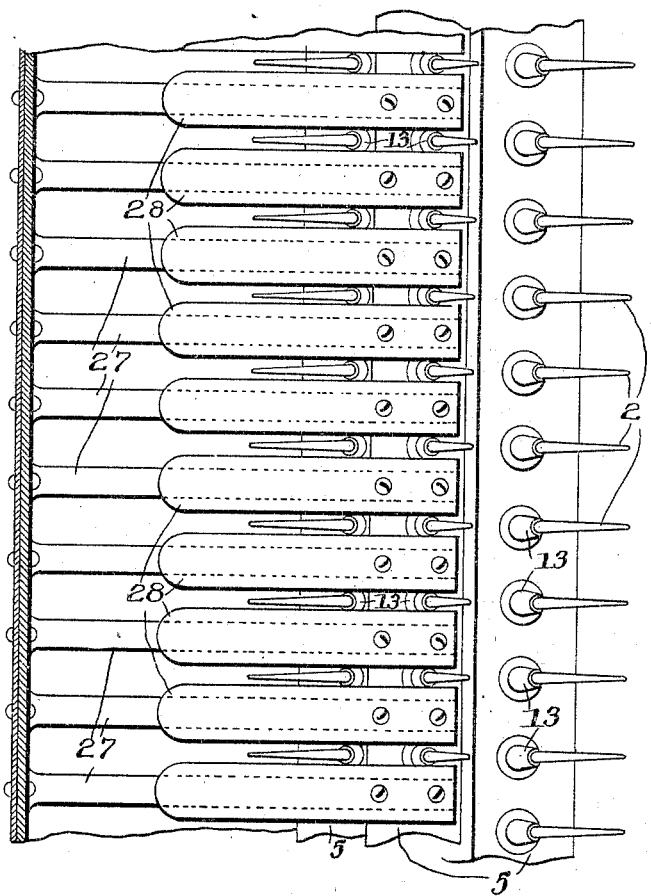
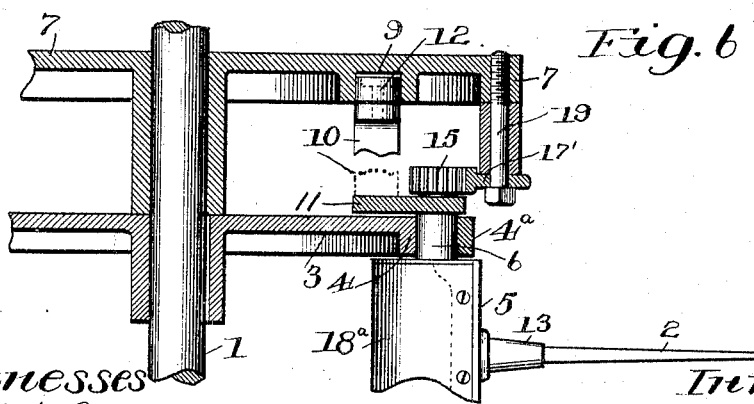

No. 788,812. Patented May 2, 1905.

UNITED STATES PATENT OFFICE.

JOHN F. APPLEBY, OF CHICAGO, ILLINOIS, ASSIGNOR TO DIXIE COTTON PICKER COMPANY, OF REDFIELD, SOUTH DAKOTA, A CORPORATION OF SOUTH DAKOTA.

COTTON-PICKING MACHINE.

SPECIFICATION forming part of Letters Patent No. 788,812, dated May 2, 1905.

Application filed May 28, 1904. Serial No. 210,190.

*To all whom it may concern:*

Be it known that I, JOHN F. APPLEBY, a citizen of the United States, residing at Chicago, in the county of Cook and State of Illinois, have invented a certain new and useful Improvement in Cotton-Picking Machines, of which the following is a full, clear, concise, and exact description, reference being had to the accompanying drawings, forming a part of this specification.

My invention relates to improvements in cotton-picking machines wherein the picking-fingers are projected into the cotton-plant and axially rotated during the operation of gathering cotton from the bolls of the plants and wherein the axial rotation of said fingers ceases when the same are withdrawn from the plants. In machines of this class the rotary or sinuous bodily movement of the fingers in being projected into and withdrawn from the cotton-plant is desirably continuous, while the axial rotation of the fingers is intermittent. The devices for effecting the intermittent action of the fingers are desirably distinct and independent from the continuously-driven parts and must be capable of quick and effective engagement.

One object of my invention is the provision of means whereby the intermittent coöperation of the picking-finger mechanism and the driving mechanism therefor may be yieldingly effected to insure an operative engagement.

A further object of my invention is the provision of means for stripping the gathered cotton from the picking-fingers, said means being desirably supplemented by mechanism for causing axial rotation of said fingers in a direction preferably opposite to the direction of rotation of the fingers when the same are projected into the cotton-plant.

Heretofore in machines of this class a plurality of gear-pinions and a rack have constituted the actuating means for intermittently effecting the axial rotation of the picking-fingers. In the employment of this form of device great difficulty has been experienced in providing simple and effective means for insuring a "mesh" engagement of the pinions with the rack at that point in the operation of the machine where the fingers are projected into the bush and the axial rotation of the said fingers is started, it being a common occurrence for the teeth of the pinions and the rack to engage "end to end," causing breakage of teeth and violent and injurious strains to the mechanism. To overcome these defects, I desirably provide means whereby one of the engaging elements, preferably the rack, is yieldingly mounted, permitting the same to be temporarily displaced from its normal position to effect an operating mesh of the coöperating elements after a "non-meshing" engagement of the teeth of said elements has resulted.

One of the preferred embodiments of my invention includes a rack which is not only capable of a yielding movement in the direction of its length, but which may also yield in an angular plane to the line of travel of the pinions, thus providing a cushioning or yielding action for the rack to insure a mesh engagement of the coöperating parts.

My invention may be realized by utilizing a sectional rack, one member thereof being articulated with the other to permit displacement in one direction, the said other section being yieldingly mounted to permit displacement in another direction.

A further improvement consists of stripping means whereby the cotton which is wound about the picking-fingers in their passage through the cotton-plant may be removed therefrom by stripping-fingers, which desirably project into the rotative path of the picking-fingers and preferably also extend to the outer peripheral path thereof during a portion of the bodily travel of said fingers. To further aid in removing the gathered cotton from the picking-fingers, I desirably provide means whereby the latter are axially rotated, preferably when opposite the stripping mechanism, the direction of rotation of said fingers at this point being preferably opposite to the direction of rotation of the same when they are projected into the cotton-plant.

I will describe my invention more particularly with respect to the accompanying drawings, in which—

Figure 1 shows in plan section a single group of picking-fingers and the operating mechanism therefor. Fig. 2 is a detail view of the yieldingly-mounted driving mechanism for the picking-fingers and rotating supports therefor. Fig. 3 is a detail sectional view on line *a a* of Fig. 1. Fig. 4 is a detail sectional view on line *b b* of Fig. 1. Fig. 5 is a detail sectional view on line *c c* of Fig. 1. Fig. 6 is a detail sectional view on line *d d* of Fig. 1.

Like parts are indicated by similar characters of reference throughout the different figures.

My invention is illustrated in connection with a form of cotton-picking machine wherein the picking-fingers are grouped in housings which are spaced apart and adapted to pass on opposite sides of rows of cotton-plants, the picking-fingers traveling horizontally and projecting into the plants in opposite directions. As the coöperating fingers and the operating mechanism thereof in each housing are substantially alike in all respects, the description and illustration of the mechanism of one side will be sufficient. I do not wish, however, to limit the application of my invention to this particular form of machine.

A shaft 1, having bearings and suitable driving-gear, (not shown,) desirably constitutes an actuating-support for the picking-fingers 2 and the operating devices therefor. Said operating devices preferably include a rotatable actuating mechanism desirably also acting as a supporting means in the form of a circular support 3, which is keyed or otherwise rigidly mounted on the shaft 1 and which is desirably provided with bearings 4, located at the peripheral margin of said support 3 and integrally formed therewith, said bearings in the preferred embodiment having removable caps 4ª. Rotatably-mounted bearing-frames 5 are desirably journaled in said bearings 4, the said frames having bodily rotation about the shaft 1 as a common center and independent axial rotation about the axes of their journals 6, as will be clearly seen by reference to Fig. 1. The bodily rotation of the bearing-frames 5 is effected by the shaft 1 and the supports 3, while the axial rotation of said frames is effected by an independent actuating means, which in the preferred construction includes a cam 7. Said cam is non-rotatably mounted, as shown, upon vertically-disposed angle-irons 8, forming parts of a supporting-frame for the fingers and their actuating mechanism, and is provided with an aperture through which the shaft 1 passes. A closed cam-race 9, preferably continuous, is formed in the lower face of the cam-disk 7 and coöperates with arms 10 of the bearing-frames 5 in effecting the axial rotation of said frames and also the desired angular positions of the picking-fingers 2, which are rotatably mounted in said frames. The arms 10 are desirably provided with extensions 11, which, as shown, are formed integral with the journals of the frames 5, the said extensions 11 constituting a projecting support connecting the arms 10 with the frames 5, desirably at one side of the journals 6. Said arms 10 are desirably inclined with respect to the length of the frames 5 to permit the said arms to overlap, and thereby freely pass one another at points in their bodily rotation when the cam 7 brings the upper ends of the arms 10 closely together. The direct engagement of the arms 10 with the cam-race 9 is desirably effected by antifriction-rollers 12, secured to the upper and outer ends of said arms. The said bearing-frames 5 are desirably provided with apertured projections 13, which form bearings for the base ends of the picking-fingers 2. It will be obvious that the bodily and axial rotation of the frames 5 effects bodily rotation and the desired angular positions of the fingers 2. The means whereby the axial rotation of said fingers 2 is effected during their bodily travel includes the following mechanism: Driving-shafts 14, which extend throughout the length of said frames 5, find bearing in the journals 6 of said frames and carry pinions 15 on their outer ends, which pinions abut against the outer faces of the arms 11. The projecting arms 10 are positioned on the outer ends of said arms 11 to permit the gear-pinions 15 to engage driving mechanism hereinafter more fully described. The driving-shafts 14 effect axial rotation of the fingers 2 by means of miter-gears 16, carried by said shafts, which gears mesh with miter-gears 17, secured on the base ends of the picking-fingers 2. It will be obvious that this construction permits of angular adjustment of the picking-fingers and also the intermittent rotation of the same during the bodily travel of said fingers. I desirably employ guards 18ª, which are desirably of comparatively thin material to prevent access to said gears of foreign particles tending to clog or in any way interfere with the operation thereof. The driving mechanism whereby the axial rotation of said fingers is intermittently effected includes in the preferred construction a yieldingly-mounted rack 17′, which is located in a coincident plane with the plane of operation of the pinions 15 and which coöperates with said pinions during portions of their bodily travel. The yielding action or movement of said rack is desirably in the direction of its length and also preferably in the direction of bodily rotation of the gear-pinions 15. Said rack 17′ is provided with slots 18, which coöperate with anchoring-bolts 19, the latter having threaded engagement with the cam 7. In order to maintain the end walls of said slots 18 normally in contact with the bolts 19 to permit movement of the rack in an opposite direction corresponding to the bodily movement of the pinions 15, a spring 20 is provided, which, as shown, is interposed between a lug 21, formed upon a fixed part, preferably the cams 7, and a lug 22, formed upon the rack. Said rack 17' is in the preferred embodiment of sectional formation, being provided with a section 23, which is yieldingly hinged, desirably, to the rack-section 17'. In order to maintain said hinged section 23 in circular alinement with the section 17', the said sections are provided, respectively, with lugs 24 and 25, which constitute opposing faces for an expansively-acting spring 26, the said hinge itself preventing movement of the section 23 beyond its alinement in an inward direction with respect to the rack 17'. It will be seen from the described structure that an end-to-end engagement of one tooth of a pinion 15 with a tooth of the section 23 would be released by a slight movement of the rack permitting the engaged pinion a slight rotative action, causing the engaged tooth of the pinion to be thrust to one side of the said tooth on the section 23, and thereby effecting a mesh engagement of the parts. The yielding action of the rack producing the above result may be in the direction of its length, thereby acting against the spring 20, or it may consist in an outward movement of the section 23 against the action of the spring 26, or both. Thus it will be seen that a twofold provision is made which would quickly and effectively act to release the pinions 15 from a non-meshing engagement with the rack without regard to the positions assumed by the said coöperating members. This construction is a simple and effective means of avoiding the defects of prior devices, wherein the mounting of the coöperating parts are subjected to severe strains and often to breakage when the teeth of the gear-pinions and driving-rack fail to mesh.

A stripping mechanism including a rack having finger-supports 27 is desirably anchored, as shown, to the housing of the supporting-frame. The fingers 27 of said supporting-rack project into the rotating path traversed by the picking-fingers 2, desirably to a point near the bases thereof, said fingers 27 being preferably not of sufficient width to fill the space intervening the said fingers 2. Stripping-fingers 28, which are desirably of sufficient width to substantially fill the space intervening the fingers 2 and permit the latter ample freedom of movement, are shown anchored at their ends upon the outer projecting ends of the fingers 27, near the bases of the picking-fingers 2, said stripping-fingers projecting from their anchored ends outwardly a distance sufficient to bring the outer ends of said stripping and picking fingers opposite at times during the bodily travel of said picking-fingers, as shown by dotted lines in Fig. 1. It will be obvious from the foregoing that the picking-fingers in their bodily travel pass through a stripping mechanism including fingers that are unconnected throughout their length and are at their outer ends not engaged by the supporting-rack. This construction possesses great advantages over forms of stripping mechanism having fingers closed or connected near their operating ends, in which forms the stripped cotton would tend to lodge, thereby not only causing an imperfect delivery of the cotton from the stripping mechanism, but preventing an effective stripping action of picking-fingers passing through the stripping-rack when in its clogged condition. In my improved stripping mechanism the cotton is released from the picking-fingers and stripping-fingers preferably when the ends of the same are opposite, leaving the said cotton free at the outer ends of said stripping-fingers to descend by gravity onto an elevator or any form of conveying or receiving device provided. This receiving feature is not herein illustrated, as it forms no part of this invention.

Mechanism supplementing the action of the stripping-fingers 28 in removing the cotton from the picking-fingers 6 is desirably employed and in the preferred embodiment includes a rack 29. Said rack 29 is located in a position to engage the pinions 15 to effect axial rotation of the picking-fingers in a reverse direction to the direction of rotation of said fingers when the same are passing through the cotton-plants. It will be obvious that this precise arrangement is not essential to a successful driving mechanism, although it is herein shown as the preferred form.

The rack 29 is desirably yieldingly mounted to insure a mesh engagement of the pinions 15 therewith, said mounting including a bolt 30 rigidly secured to a stationary member, preferably the cam 7, to which said rack is rotatably secured. Said bolt, as shown, also carries a block 31, which is non-rotatably mounted thereon and which in connection with a spring 32 serves to maintain said rack 29 in working alinement with the gear-pinions 15 in the following manner: A rod 33, formed integral with the rack 29 and desirably circular in form, coöperates with an aperture in said block 31 of complemental form, said rod and aperture having the bolt as a common center. The opposing faces of the rack 29 and the block 31, together with the rod 33 about which said spring is coiled, serve as a mounting therefor, said spring 32 normally holding the rack 29 in working alinement with the pinions 15 and permitting said rack to be thrust slightly out of alinement when the teeth of said pinions and the rack engage end to end. Stops 34 and 35, formed upon the block 31 and the rack 29, are normally in engagement with each other to prevent the spring 32 from thrusting the said rack beyond its working alinement with the gears 15 in an outward direction. It will be understood that the reversed axial rotation of the fingers 2 need not be effected except during the operation of stripping said fingers of the gathered cotton and that the said rotation need not be continuous throughout the stripping operation, inasmuch as a comparatively few revolutions of said fingers will effect a sufficient loosening of the cotton to permit ready removal thereof by the said stripping-fingers.

While I have herein shown and described one embodiment of my invention, it will be obvious that changes may be made therefrom without departing from the spirit of my invention.

Therefore what I claim as new, and desire to secure by Letters Patent, is—

1. In a cotton-picking machine, the combination with a plurality of picking-fingers, of actuating mechanism therefor including gears, a rotating element whereby said fingers and gears are bodily rotated, a yieldingly-mounted sectional rack coöperating with said gears during a portion of the bodily rotation thereof to effect axial rotation of groups of picking-fingers in one direction, a yieldingly-mounted rack coöperating with said gears to rotate said fingers in an opposite direction to the direction of rotation of said fingers by said first-mentioned rack, and stripping-fingers coöperating with said picking-fingers during the axial rotation thereof by said last-mentioned rack, substantially as described.

2. In a cotton-picking machine, the combination with a plurality of picking-fingers, of actuating mechanism therefor including gears, a rotating element whereby said fingers and gears are bodily rotated, a rack coöperating with said gears during a portion of the bodily rotation thereof to effect axial rotation of groups of picking-fingers in one direction, a yieldingly-mounted rack coöperating with said gears to rotate said fingers in an opposite direction to the direction of rotation of said fingers by said first-mentioned rack, and stripping-fingers coöperating with said picking-fingers during the axial rotation thereof by said last-mentioned rack, substantially as described.

3. In a cotton-picking machine, the combination with a plurality of picking-fingers, of actuating mechanism therefor including gears, and actuating mechanism whereby said gears and fingers are bodily actuated, a yieldingly-mounted rack coöperating with said gears during a portion of the bodily rotation thereof to effect axial rotation of groups of picking-fingers in one direction, a yieldingly-mounted rack coöperating with said gears to rotate said fingers in an opposite direction to the direction of rotation of said fingers by said first-mentioned rack, and stripping-fingers coöperating with said picking-fingers during the axial rotation thereof by said last-mentioned rack, the said last-mentioned rack effecting the reverse operation of said picking-fingers during a portion of their coöperation with said stripping-fingers, substantially as described.

4. In a cotton-picking machine, the combination with a plurality of picking-fingers, of actuating mechanism therefor including gears, actuating mechanism whereby said gears and fingers are bodily actuated, a yieldingly-mounted rack coöperating with said gears to rotate said fingers, and stripping-fingers coöperating with said picking-fingers during the axial rotation thereof, said yieldingly-mounted rack effecting the rotation of said picking-fingers when in coöperation with said stripping-fingers, substantially as described.

5. In a cotton-picking machine, the combination with a plurality of picking-fingers, of actuating mechanism therefor including gears, mechanism whereby said fingers and gears are bodily actuated, a yieldingly-mounted sectional rack coöperating with said gears during a portion of the bodily travel thereof to effect the axial rotation of groups of picking-fingers in one direction, a rack coöperating with said gears to rotate said fingers in an opposite direction to the direction of rotation of said fingers by said first-mentioned rack, and stripping-fingers coöperating with said picking-fingers during the axial rotation thereof by said last-mentioned rack, substantially as described.

6. In a cotton-picking machine, the combination with a plurality of picking-fingers, of actuating mechanism therefor including gears, mechanism whereby said fingers are bodily actuated, a rack coöperating with said gears during a portion of the bodily travel thereof to effect the axial rotation of groups of picking-fingers in one direction, a yieldingly-mounted rack coöperating with said gears to rotate said fingers in an opposite direction to the direction of rotation of said fingers by said first-mentioned rack, and stripping-fingers coöperating with said picking-fingers during the axial rotation thereof by said last-mentioned rack, substantially as described.

7. In a cotton-picking machine, the combination with a plurality of picking-fingers, of actuating mechanism therefor including gears, a rotating element whereby said gears and fingers are bodily rotated about a common axis, and a yieldingly-mounted rack coöperating with said gears during a portion of their rotary travel and effecting axial rotation of groups of picking-fingers, substantially as described.

8. In a cotton-picking machine, the combination with a plurality of picking-fingers, of actuating mechanism therefor including gears, mechanism effecting bodily travel of said gears and fingers, and a yieldingly-mounted rack coöperating with said gears during a portion of their bodily travel and effecting axial rotation of groups of picking-fingers, substantially as described.

9. In a cotton-picking machine, the combination with a plurality of picking-fingers, of actuating mechanism therefor, mechanism effecting bodily travel of said actuating mechanism and fingers and yieldingly-mounted mechanism coöperating with said actuating mechanism during a portion of the bodily travel thereof and effecting rotation of groups of said fingers, substantially as described.

10. In a cotton-picking machine, the combination with a plurality of picking-fingers, of actuating mechanism therefor including gears, a rotating element whereby said gears and fingers are bodily rotated about a common axis, and a yieldingly-mounted rack coöperating with said gears during a portion of their rotary travel and effecting axial rotation of said picking-fingers, substantially as described.

11. In a cotton-picking machine, the combination with a plurality of picking-fingers, of actuating mechanism therefor including gears, an element effecting bodily travel of said gears and fingers, and a yieldingly-mounted rack coöperating with said gears during a portion of their bodily travel and effecting axial rotation of said picking-fingers, substantially as described.

12. In a cotton-picking machine, the combination with a plurality of picking-fingers, of actuating mechanism therefor, mechanism effecting bodily travel of said actuating mechanism and fingers and yieldingly-mounted mechanism coöperating with said actuating mechanism during a portion of the bodily travel thereof and effecting rotation of said fingers, substantially as described.

13. In a cotton-picking machine, the combination with a plurality of picking-fingers, of actuating mechanism therefor including gears, a rotating element whereby said actuating mechanism and fingers are bodily rotated about a common axis, and a sectional rack having one section yieldingly mounted, said rack coöperating with said gears during a portion of their rotary travel and effecting axial rotation of groups of said fingers, substantially as described.

14. In a cotton-picking machine, the combination with a plurality of picking-fingers, of actuating mechanism therefor including gears, mechanism effecting bodily travel of said actuating mechanism and fingers, and a sectional rack having one section yieldingly mounted, said rack coöperating with said gears during a portion of the bodily travel thereof and effecting axial rotation of groups of picking-fingers, substantially as described.

15. In a cotton-picking machine, the combination with a plurality of picking-fingers, of actuating mechanism thereof, mechanism effecting bodily travel of said actuating means and fingers, and sectional driving mechanism having one section yieldingly mounted, said latter mechanism coöperating with said actuating mechanism during a portion of the bodily travel thereof and effecting rotation of groups of said fingers, substantially as described.

16. In a cotton-picking machine, the combination with a plurality of picking-fingers, of actuating mechanism therefor including gears, a rotating element whereby said actuating mechanism and gears are bodily rotated about a common axis, and a sectional rack having one section yieldingly hinged, said rack coöperating with said gears during a portion of the bodily travel thereof and effecting axial rotation of groups of said fingers, substantially as described.

17. In a cotton-picking machine, the combination with a plurality of picking-fingers, of actuating mechanism therefor including gears, mechanism effecting bodily travel of said gears and fingers, and a sectional rack having one section yieldingly hinged, said rack coöperating with said gears during a portion of the bodily travel thereof and effecting axial rotation of groups of said picking-fingers, substantially as described.

18. In a cotton-picking machine, the combination with a plurality of picking-fingers, of actuating mechanism therefor, mechanism effecting bodily travel of said actuating means and fingers, and sectional driving mechanism having one section yieldingly hinged, said driving mechanism coöperating with said actuating mechanism during a portion of the bodily travel thereof serving to rotate said fingers, substantially as described.

19. In a cotton-picking machine, the combination with a plurality of picking-fingers, of actuating mechanism therefor including gears, a rotating element whereby said gears and fingers are bodily rotated about a common axis, and a sectional rack having one section yieldingly hinged upon another section, said rack coöperating with said gears during a portion of their rotary travel and effecting axial rotation of groups of said picking-fingers, substantially as described.

20. In a cotton-picking machine, the combination with a plurality of picking-fingers, of actuating mechanism therefor including gears, mechanism effecting bodily travel of said actuating mechanism and fingers, and a sectional rack having one section yieldingly hinged upon another section, said rack coöperating with said gears during a portion of the bodily rotation thereof and effecting axial rotation of said picking-fingers, substantially as described.

21. In a cotton-picking machine, the combination with a plurality of picking-fingers, of actuating mechanism therefor, mechanism effecting bodily travel of said actuating mechanism and fingers, and sectional driving mechanism having one section yieldingly hinged upon another section, said sectional driving mechanism coöperating with said actuating mechanism during a portion of the bodily travel thereof and effecting rotation of groups of said fingers, substantially as described.

22. In a cotton-picking machine, the combination with a plurality of cotton-picking fingers, of actuating-gears therefor, stripping mechanism including a plurality of stripping-fingers projecting into the path of travel of said picking-fingers, and a yieldingly-mounted rack adapted to engage said gears and effecting axial rotation of said picking-fingers during the coöperation thereof with said stripping mechanism, substantially as described.

23. In a cotton-picking machine, the combination with a plurality of cotton-picking fingers, of stripping mechanism therefor including stripping-fingers projecting into the path of travel of said picking-fingers and anchored at their inner ends to permit said stripping-fingers to engage the gathered cotton on the picking-fingers near the bases thereof, the outer ends of said stripping-fingers and picking-fingers being opposite when they separate and permitting the stripped cotton to disengage itself from said stripping-fingers by gravity, the said stripping-fingers being free and unconnected throughout their length, substantially as described.

24. In a cotton-picking machine, the combination with a plurality of cotton-picking fingers, of stripping mechanism therefor including stripping-fingers projecting into the path of travel of said picking-fingers and anchored at their inner ends to permit said stripping-fingers to engage the gathered cotton on the picking-fingers near the bases thereof, the said stripping-fingers being substantially free and unconnected throughout their effective length, substantially as described.

In witness whereof I hereunto subscribe my name this 24th day of May, A. D. 1904.

JOHN F. APPLEBY.

Witnesses:
  G. L. CRAGG,
  C. H. CRAWFORD.